United States Patent
Lee et al.

(10) Patent No.: US 10,164,300 B2
(45) Date of Patent: Dec. 25, 2018

(54) SENSING FEATURE ON FUSE ELEMENT FOR DETECTION PRIOR TO FUSE OPEN

(71) Applicant: GM Global Technology Operations LLC, Detroit, MI (US)

(72) Inventors: John J. Lee, Novi, MI (US); Leonard B. Cantrell, Royal Oak, MI (US); Yue Fan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 386 days.

(21) Appl. No.: 14/971,406

(22) Filed: Dec. 16, 2015

(65) Prior Publication Data

US 2017/0179548 A1    Jun. 22, 2017

(51) Int. Cl.
*H01M 10/48* (2006.01)
*H01H 69/02* (2006.01)
(Continued)

(52) U.S. Cl.
CPC ............ *H01M 10/48* (2013.01); *B60L 11/18* (2013.01); *H01H 69/02* (2013.01); *H01H 85/06* (2013.01);
(Continued)

(58) Field of Classification Search
CPC ............ H01M 10/48; H01M 2/1077; H01M 10/0525; H01M 2/1072; H01M 10/425;
(Continued)

(56) References Cited

U.S. PATENT DOCUMENTS 4,204,183 A * 5/1980 Blewitt ............... H01H 69/02
337/159
4,357,588 A * 11/1982 Leach ............... H01H 85/055
337/160
(Continued)

FOREIGN PATENT DOCUMENTS

DE     102009057479 A1    6/2011
DE     102014014469 A1    3/2015
(Continued)

*Primary Examiner* — Jared Fureman
*Assistant Examiner* — Michael Warmflash
(74) *Attorney, Agent, or Firm* — Quinn IP Law

(57) ABSTRACT

A sensing circuit, a vehicular battery pack using a sensing circuit, a method of protecting a circuit with a fuse and a method of providing battery power to a vehicle. The sensing circuit includes the fuse, which is made up of a main element and a sensing element such that the sensing element defines a pre-open detection capability through at least one of a dissimilar geometric profile or a different material choice from that of the main element. The sensing circuit also includes an electrical connector between one or more battery cells and an electronic control module so that the circuit provides indicia of the fusing event. In this way, a fuse opening event takes place in the sensing element prior to the main element in such a way as to give the operator of a battery-powered vehicle advance warning of an impending opening of the main element and consequent electrical circuit shutdown, thereby allowing the operator of the vehicle to take corrective measures as a way to avoid fuse opening and a related loss of vehicular propulsive power.

22 Claims, 5 Drawing Sheets

(51) Int. Cl.
  *H01H 85/06* (2006.01)
  *H01H 85/10* (2006.01)
  *H01M 2/10* (2006.01)
  *H01M 10/0525* (2010.01)
  *H01M 10/058* (2010.01)
  *H01M 10/42* (2006.01)
  *B60L 11/18* (2006.01)
  *H01H 85/02* (2006.01)

(52) U.S. Cl.
  CPC .......... *H01H 85/10* (2013.01); *H01M 2/1072* (2013.01); *H01M 2/1077* (2013.01); *H01M 10/058* (2013.01); *H01M 10/0525* (2013.01); *H01M 10/425* (2013.01); *H01H 2085/025* (2013.01); *H01H 2231/026* (2013.01); *H01M 2010/4278* (2013.01); *H01M 2200/103* (2013.01); *H01M 2220/20* (2013.01)

(58) Field of Classification Search
  CPC .......... H01M 10/058; H01M 2200/103; H01M 2010/4278; H01M 2220/20; B60L 11/18; H01H 85/10; H01H 85/06; H01H 69/02
  See application file for complete search history.

(56) References Cited

U.S. PATENT DOCUMENTS

| | | | | |
|---|---|---|---|---|
| 5,252,942 A * | 10/1993 | Gurevich | ............ | H01H 85/055 337/159 |
| 5,298,877 A * | 3/1994 | Gurevich | ............ | H01H 85/045 337/163 |
| 6,243,245 B1 * | 6/2001 | Totsuka | ............ | H01H 85/46 361/103 |
| 8,334,699 B2 * | 12/2012 | Asakura | ............ | G01R 31/025 320/132 |
| 2005/0077878 A1 * | 4/2005 | Carrier | ............ | B25F 5/00 320/134 |
| 2007/0018774 A1 * | 1/2007 | Dietsch | ............ | H01H 85/0411 337/159 |
| 2009/0027821 A1 * | 1/2009 | Colby | ............ | H01C 7/02 361/104 |
| 2010/0245026 A1 * | 9/2010 | Kobayashi | ............ | H01H 85/046 337/293 |
| 2013/0179012 A1 * | 7/2013 | Hermann | ............ | B60L 3/0046 701/22 |
| 2014/0356671 A1 * | 12/2014 | Dawley | ............ | H01M 2/206 429/90 |
| 2016/0064173 A1 * | 3/2016 | Bukacek | ............ | H01H 85/042 337/159 |
| 2016/0268819 A1 * | 9/2016 | Han | ............ | H01M 2/348 |

FOREIGN PATENT DOCUMENTS

| | | |
|---|---|---|
| DE | 102014016577 A1 | 5/2016 |
| GB | 515747 A | 12/1939 |

* cited by examiner

SENSING FEATURE ON FUSE ELEMENT FOR DETECTION PRIOR TO FUSE OPEN

BACKGROUND OF THE INVENTION

This invention relates generally to sensing and protective components used in conjunction with an automotive battery-powered system, and more particularly to a way to provide advance warning of when a vehicular disabling event related to such fuse opening is about to occur.

Batteries using lithium-ion (Li-ion) or other chemistries are being used in transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. In one form suitable for automotive applications, individual battery cells are combined into larger assemblies such that the current or voltage is increased to generate the desired power output. In the present context, larger module and pack assemblies are made up of one or more cells joined in series, parallel or both, and include additional structure to ensure proper installation into the vehicle. Although the term "battery pack" is used herein to discuss a substantially complete battery assembly for use in propulsive power applications, it will be understood by those skilled in the art that related terms—such as "battery unit" or the like—may also be used to describe such an assembly, and that either term may be used interchangeably without a loss in such understanding.

It is desirable as part of the electrical connectivity between the various individual cells within the battery pack, as well as between the battery pack and the electrical loads discussed above, to include sensing circuitry (such as voltage-sensing or current-sensing variants) to allow for monitoring and the related detection of abnormal voltage conditions within the pack and various battery cells. Moreover, it is desirable to have voltage isolation circuitry responsive to such sensing circuitry to allow for shutdown or related corrective measures to be taken in the event an anomalous condition arises during the operation of the vehicle; one form of voltage isolation circuitry that is used by the Assignee of the present invention is known as a manual service disconnect (MSD) as described in U.S. Pat. No. 8,574,004—the entirety of which is incorporated by reference herein—that permits a simple disconnect for service or emergency response personnel to reduce their exposure to the full voltage of the battery pack. These and other circuits are connected to the battery packs and other electronic components (such as one or more automobile electronic control units (ECU) that in turn embody hardware and software features to define one or more computers, controllers or the like) to provide integration of the vehicle's electrical power and control systems.

One significant part of the electrical connectivity discussed above is in the form of fail-safe components, such as circuit breakers or fuses that are designed to cause an open circuit when a particular electrical parameter (such as current) exceeds a predetermined threshold. In a conventional form, the fuse is an "off-the-shelf" component that is subject to limitations in its operational consistency due to variations in manufacturing, material quality or the like. In fact, fuse part-to-part variation has been identified as being as high as 60%, and that much of this is due to variations in fatigue life arising from inconsistencies in punch tool sharpness and material properties, as well as fatigue damage that may have accumulated before final assembly. The present inventors have determined that fatigue failure from these and other causes leads to shortened fuse service life. More particularly, because conventional sensing circuits cooperate with the ECU through an algorithm or related program that is based on a worst-of-the-worst (WOW) part failure assumption, these variations in fuse-opening events (also referred to herein as fusing events) tend to cause diagnostic codes (also referred to as diagnostic trouble codes (DTCs)) that are integrated into the ECU's on-board diagnostics (OBD) system to err on the side of extreme caution. This overly conservative assumption of when the fuse will open leads to inordinate amounts of vehicle shutdown and concomitant operator/passenger displeasure, as well as increases in false maintenance reporting and procedures. The present inventors have additionally determined that these variations in fusing events are particularly problematic when differences in driving habits are taken into consideration, as vehicle operators with more aggressive driving habits are more likely to pre-maturely trigger an actual fuse open event than a vehicle operator with more docile driving habits. For example, a conventional DTC may be programmed for the more aggressive driving parameters; because component reliability requirements are often set at extremely high values to take into consideration a WOW fuse, a vast majority of the fuses installed in vehicles in general (and vehicular battery systems in particular) have their useful life limited to that of the WOW fuse.

As such, what is needed is a way to take into consideration variations in the conditions that lead to fuse open events, as well as ways sensing circuits respond to such variations. What is further needed is a way to detect impending fuse openings prior to an actual opening event; this early detection allows the DTC to be activated to alert a user to take a vehicle in for service rather than wait for a fuse open event that may result in a loss of current being delivered from the battery to the vehicle's propulsion system. Additionally, what is needed is such a configuration that achieves this warning with reduced false alerts.

SUMMARY OF THE INVENTION

In accordance with one aspect of the present invention, an assembly for use with an automotive battery pack is disclosed. The assembly includes at least one fuse comprising a fuse with a main element and a sensing element. The sensing element uses at least one of differing size, shape or material so that it opens due to cyclic loading under expected operating limits before the main element does. In that way, it acts as a sacrificial piece while still allowing the main element of the fuse to remain in a conducting state. Wires, leads or related electrical conductors connected to the fuse means that upon receipt of an electrical signal from the at least one battery cell or an electronic control unit or related module cooperative therewith, the sensing circuit provides indicia that a fatigue condition has set in that could lead to a fuse open event in the near future. As such, rather than basing the design on an overly conservative conventional WOW criteria, this enables system designers to use a control algorithm that sets a trouble code based on each fuse's individual characteristics; this optimizes available life of each fuse, as well as allows a driver or other user to take appropriate actions prior to loss of propulsion due to fuse opening.

In accordance with another aspect of the present invention, a battery pack configured to provide propulsive power to a vehicle is disclosed. The battery pack includes numerous battery cells aligned, a housing configured to contain the cells and numerous sensing/isolation circuits each of which is electrically cooperative with a respective one of the cells. Each of the circuits include one or more fuses formed within one or more of the sensing/isolation circuits so that in the event of an electrical anomaly, the fuse can open in order to disconnect the anomaly from voltage-sensitive or current-sensitive components. In a preferred optional form, the sensing circuits are signally integrated within one or more places within the battery pack electrical network, such as the MSD, the busbars, the interconnect board (ICB) that is used to couple numerous individual cells together, or one or more busbars that provide a current pathway among the various cells formed in it, as well as a circuit board cooperative with (or formed as part of) the ICB.

In accordance with yet another aspect of the present invention, a method of fabricating a fuse is disclosed. This includes providing a main element and a sensing element and joining them together. The two elements are cooperative with one another such that when the fuse is placed in service in an electrical circuit, a fusing event takes place in the sensing element prior to the main element. Differences in one or both of a material makeup or geometric profile of the elements helps to have the sensing element experience an opening event first as a way to promote an advance warning of an imminent opening of the main element. Such a fuse configuration may be used to protect an electrical circuit, such as those used within a battery pack used for automobile propulsion, where numerous battery cells may be arranged within a housing along with an electronic control unit such that upon operation of the battery pack, the fuse is configured to open in the sequential manner mentioned above.

In accordance with yet another aspect of the present invention, a method of providing battery power to a vehicle is disclosed. The method includes using a battery pack to provide at least a portion of propulsive power for the vehicle, and including a sensing circuit signally cooperative with at least one battery cell within the battery pack. As discussed in conjunction with the aspects above, the circuit includes one or more fuses made up of a main element and a sensing element where the sensing element defines a pre-open detection capability through differences in one or both of material makeup and geometric profile from that of the main element. The battery pack is cooperative with an electronic control unit to provide indicia of a fuse opening event to an operator or passenger within the vehicle. In one optional form, the electronic control unit is configured such that upon continued operation of the vehicle after indicia was provided to an operator or passenger, the electronic control unit operates to impart a power reduction to the battery pack as a way to minimize fatigue-inducing harm to the main element of the fuse.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

Figure 1:
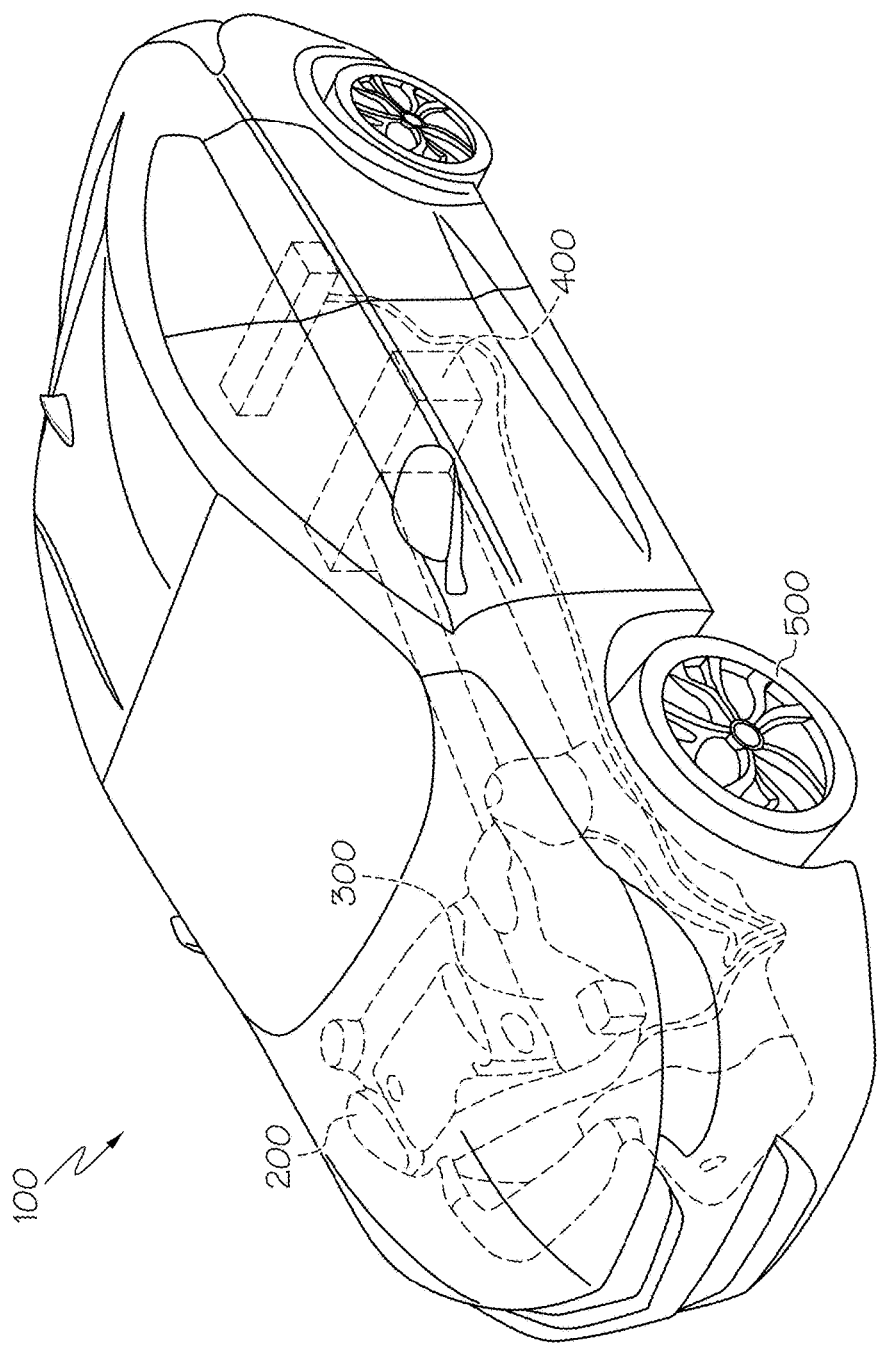
FIG. 1 is a schematic diagram of an exemplary vehicle showing the integration of a battery pack with various other subcomponents of the vehicle.
Figure 2:
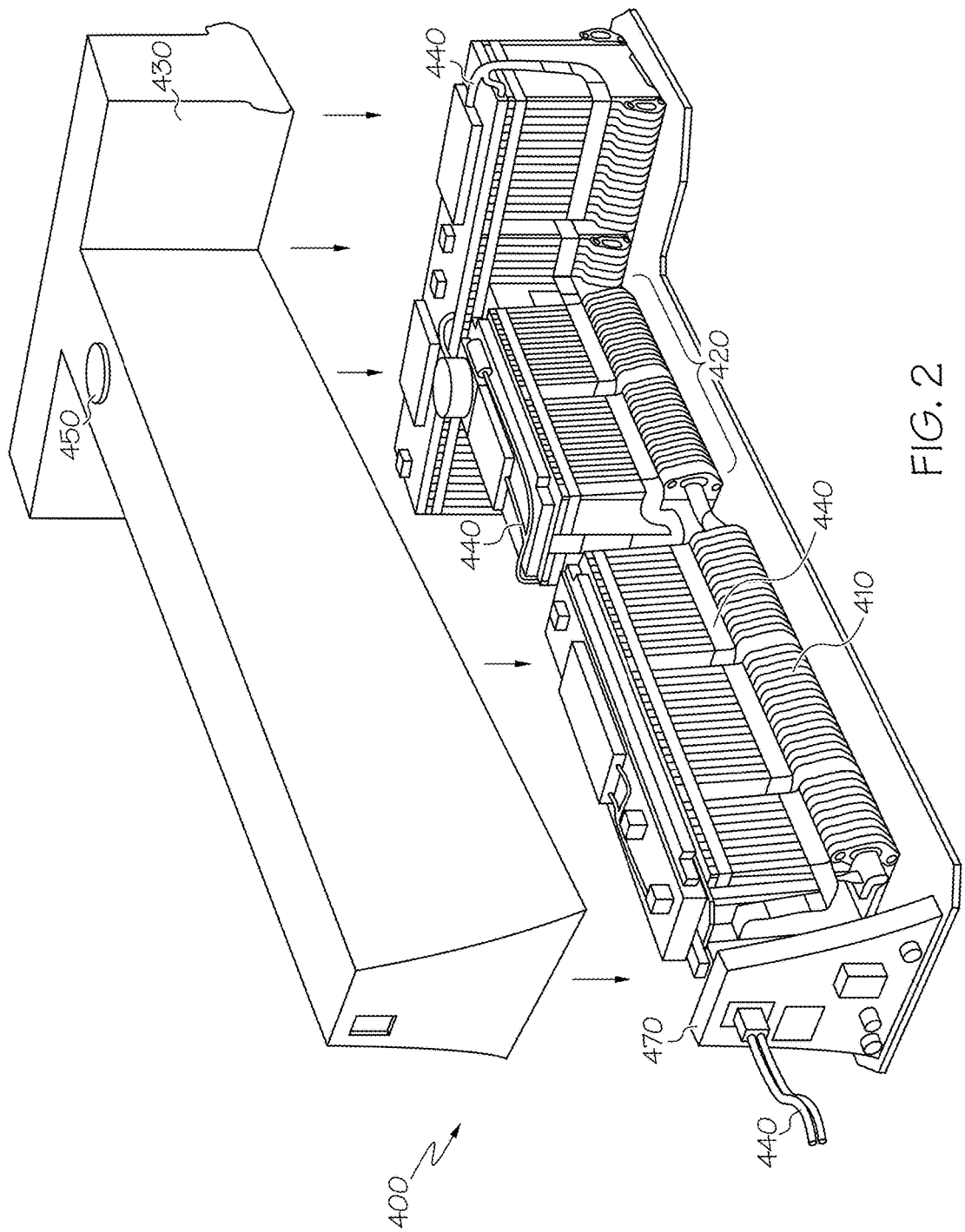
FIG. 2 is a simplified view of a battery pack that can be used in the vehicle of FIG. 1.

Referring first to FIGS. 1, and 2, views of an HEV 100 (also referred to herein as vehicle, FIG. 1) and a battery pack 400 (FIG. 2) used to propel HEV 100 are shown. Within the present context, it will be appreciated that the terms "HEV", "EV", "vehicle" or the like may apply to car, truck, van sport utility vehicle (SUV) or the like. In addition to the battery 400 (also referred to herein as battery pack to emphasize the assembled nature of multiple battery cells within), HEV 100 includes an ICE 200, one or more electric motors 300 and as well as an electronic control system (not shown). HEV 100 further includes a powertrain (not shown, which could be in the form of a transmission, driveshaft or the like) to deliver propulsive power from the ICE 200, motor/generator 300 or battery 400 to one or more of the wheels 500. Battery 400 may additionally include a state of charge (SOC) system and power inverter assembly (neither of which are shown), the latter of which includes various modules, including those for the IGBT and capacitors (not shown) as well as other conductive elements configured to provide a pathway for current flow between these and other associated battery-related electronic components. Busbar assemblies (portions of which are shown and discussed in more detail below) provide compact, reliable electrical connection between the various cells within the battery pack 400, as well as between the pack 400 and electrical loads throughout the HEV 100. Although the battery pack 400 is shown in the lower central and rear of HEV 100 (as well as in a T-shaped configuration), it will be appreciated by those skilled in the art that it may be located in any suitable location—as well as in any suitable shape—to facilitate a preferred degree of electrical and structural coupling within a particular vehicle, and that pack 400 placement, size and shape are deemed to be within the scope of the present invention. It will likewise be appreciated by those skilled in the art that while HEV 100 is presently shown as having hybrid power through both the battery pack 400 and ICE 200, one with purely electric power (i.e., an EV with no need for ICE 200) is also deemed to be within the scope of the present invention.

Referring with particularity to FIG. 2, details associated with battery pack 400 are shown in a partially-exploded view. The battery pack 400 is typically made from numerous individual Li-ion or other suitable chemistry cells 410 that are placed in a facing arrangement (much like a deck of cards) along one of two generally orthogonal stacking axes formed by the aligned plate-like surfaces, and may be grouped into larger modules 420 which are in turn contained within a housing 430. In the present context, the terms "battery cell", "battery module" and "battery pack" (as well as their shortened variants "cell", "module" and "pack") are use to describe different levels of components of an overall battery-based power system, as well as their assembly. One common vehicular form of the battery pack being investigated by the Assignee of the present invention uses air cooling, while another is normally associated with liquid cooling. The choice of one versus the other may be dictated by various vehicle integration concerns, such as cost and packaging space; regardless, either version is deemed to be within the scope of the present invention. Positive and negative terminals (or tabs, not shown) from the cells 410 to act as contacts for connection of the internally generated electrical current to a busbar, cabling or related common circuit 440 to deliver battery-produced current or motor/generator 300 produced current. The various individual battery cells 410 may also use a top covering known as an interconnect board (ICB, not shown) to communicate cell voltage information from the individual cells 410 to the circuit 440. A bulkhead 470 may serve as a housing for various relays 460 (discussed in more detail below in conjunction with FIG. 3). An MSD 450 is located on the top of the housing 430 and is used to facilitate electrical decoupling of the battery pack 400 from the various HEV 100 loads during service or for first-responder and related emergency situations.

Figure 3:
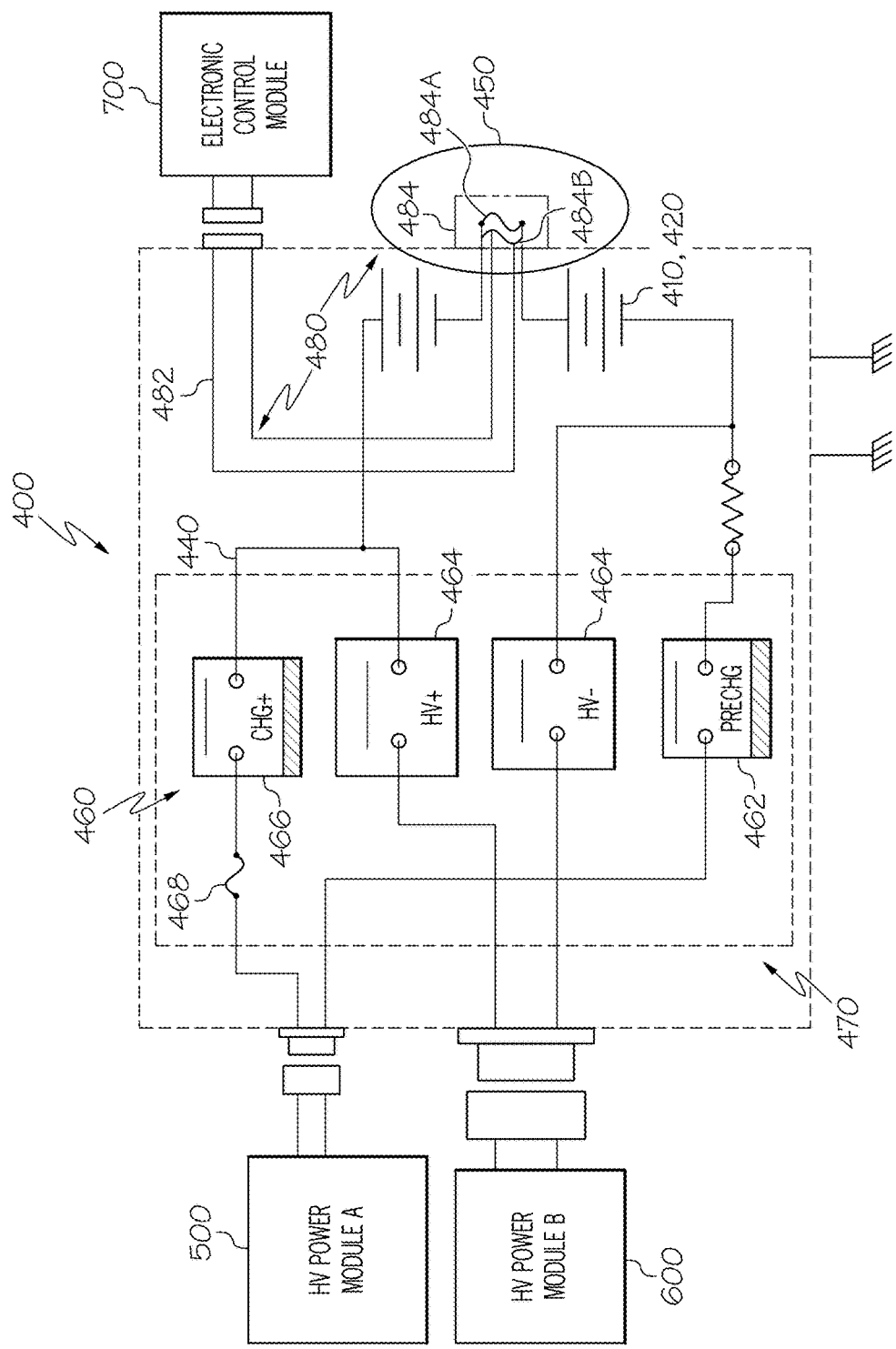
FIG. 3 shows a block diagram of one location within the battery pack of FIG. 2 where a sensing circuit with fuse according to an aspect of the present invention may be used.

Referring next to FIG. 3, a simplified schematic diagram shows the electrical cooperation between the battery pack 400 and it various individual cells 410 or their corresponding modules 420, as well as with various power modules 500, 600 and ECU 700. As presently shown, MSD 450 is shown straddling two of the modules 420 to represent that when activated, it can cut the voltage that service or emergency personnel would be exposed to in half, although it will be appreciated that differing degrees of voltage reduction may be achieved, depending on where within the battery pack 400 the MSD 450 is located. In one form, these power modules 500, 600 may serve as an onboard charge module, traction power inverter module (for a traction motor) or the like. Although not shown, the various power modules 500, 600 may house or otherwise cooperate with one or more of the aforementioned OBDs in the ECU 700 that are capable of processing signals that correspond to one or more DTCs. Examples of some diagnostic tests that may be used are discussed in more detail in co-pending U.S. patent application Ser. No. 14/040,355 (hereinafter the '355 application) entitled DISTRIBUTED VEHICLE BATTERY HIGH-VOLTAGE BUS SYSTEMS AND METHODS (now US Published Application 2015/0091377) that is owned by the Assignee of the present invention and incorporated herein by reference in its entirety. In a preferred form, the ECU 700 with OBD may be configured as a controller that is configured as automated data processing equipment, such as that associated with a digital computer. In such case, it includes one or more inputs, outputs, processing unit (often referred to as a central processing unit (CPU)) and memory that can temporarily or permanently store (among other things) the DTC, program or algorithm in the controller's memory such that the instructions contained in the code are operated upon by the processing unit based on fuse opening or related input data such that output data generated by the ECU 700 can be used elsewhere in the battery pack 400 or HEV 100. As such, the controller that makes up ECU 700 becomes particularly-adapted in order to perform at least some of the data acquisition, manipulation or related computational functions needed to provide prompt, efficient response to potential fusing (i.e., fuse-opening) events. It will be appreciated by those skilled in the art that computer-executable instructions that embody the calculations discussed elsewhere in this disclosure can be placed within an appropriate location (such as the aforementioned memory) within the controller in order to achieve the objectives set forth in the present invention. It will likewise be appreciated that ECU 700 may make up a vehicular control module, and that other such vehicular control modules may be present on HEV 100 and made to cooperate with one another to provide operative control to the same.

Main circuit 440 (which in one form may be a busbar, cable, wire or other suitable electrical conductor) is used to connect the battery pack 400 to some of these modules 500, 600 through various relays and contactors 460 that are enclosed within the bulkhead 470 and discussed in more detail in the '355 application mentioned above. These relays, which may include a pre-charge relay 462, main contactors 464 and charging relay 466, are used as switches to provide selective electrical coupling between the battery pack 400 and the power modules 500, 600. As shown with particularity in conjunction with the charging relay 466, an auxiliary fuse 468 may be present. As will be discussed in more detail below, while one preferred use of the fuse of the present invention involves it being situated within the MSD 450 as part of a sensing circuit 480, it will be appreciated by those skilled in the art that it is equally applicable to other fuses, such as auxiliary fuse 468 and others not shown. As such, it will likewise be appreciated that auxiliary fuse 468 is representative of numerous fuses that may be interspersed within—or cooperative with—battery pack 400, and that all such fuses may be configured with the main element and sensing element in the manner disclosed herein. As such, applicability to these or other fuses is deemed to be within the scope of the present invention, as is applicability to other components besides batteries within HEV 100 that derive their power from (or are otherwise cooperative with) battery 400. Some of these other components are also discussed in the '355 application.

Figure 4A:
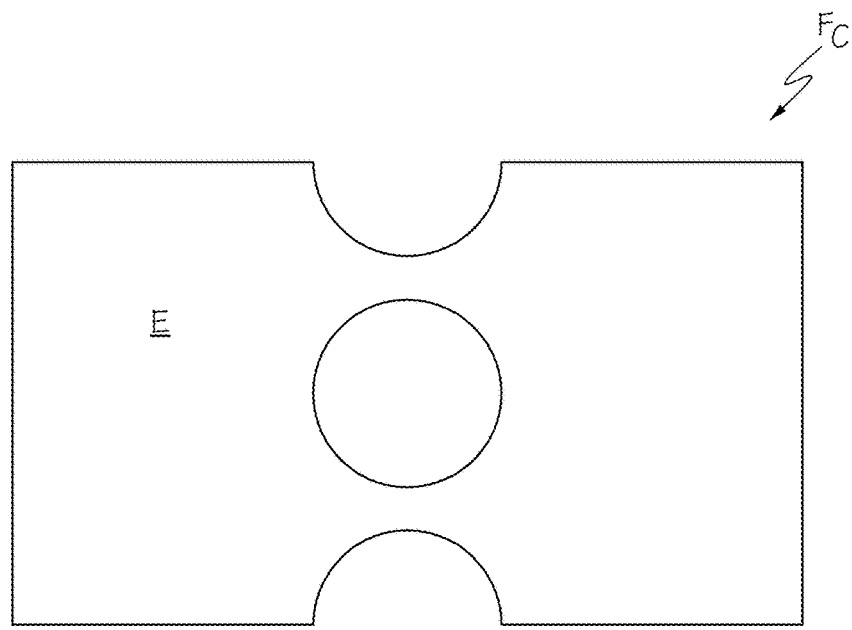
FIG. 4A shows a fuse with a notional element geometric configuration according to the prior art.
Figure 4B:
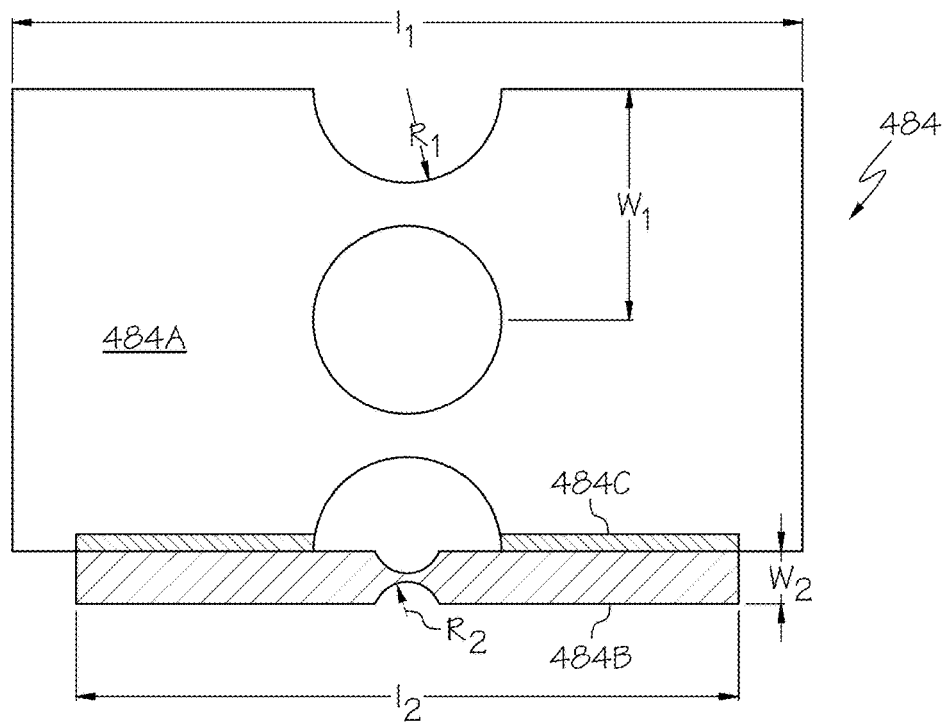
FIG. 4B shows a fuse according to an aspect of the present invention with both a main fuse element and a sensing element that can be tailored to accommodate various driving behaviors.

Sensing circuit 480 is cooperative with the main circuit 440 as well as ECM 700, and includes wires or related electrical conductors 482 and a main fuse 484. Referring next to FIGS. 4A and 4B, a comparison of a conventional fuse $F_c$ according to the prior art (FIG. 4A) and that of fuse 484 according to an aspect of the present invention (FIG. 5B) is shown. In particular, both the prior art fuse $F_c$ and fuse 484 of the present invention may define a shaped main (i.e., fusing) element (E and 484A, respectively); in both, the element may be defined by a generally thin, rectangular profile, and may be further defined by periodically spaced apertures or related cutouts (shown presently as circular in shape, although other geometric shapes are equally applicable). The purpose of these apertures is to control the location of melting when this element experienced excessive current. Selective flowing of electrical current through either the sole element E of the prior art fuse $F_c$ or the main element 484A of the fuse 484 of the present invention causes such element to expand and contract, which in turn causes it to accumulate strain. Upon a sufficient number of cycles, the respective sole and main elements E, 484A reach their metal fatigue point, causing them to break to form a fuse-opening event. Unlike the conventional fuse $F_c$ of FIG. 4A, the fuse 484 of the present invention as depicted in FIG. 4B additionally includes a sensing element 484B that is joined to the main element 484A through a joining material 484C. Preferred forms of the joining material 484C include epoxy-based adhesives, polyurethane-based adhesives, and similar polymer resin or other bonding materials or methods, so long as they possess electrical insulating properties, thermally conducting properties, and thermal-mechanical properties similar to those of both the main element 484A and the sensing element 484B. Likewise, welding, riveting, screwing or other fastening approaches may also be used, so long as they do not affect the electrical communication between the elements.

Importantly, opening of the sensing element 484B changes the electrical signal that is detected and reported to the ECU 700. This in turn causes the controller (which may form a part of ECU 700) to command appropriate notification or actions to provide the driver of HEV 100 with ample warning—as well as reduce the likelihood—of a main element 484A opening event and the consequent user "walk home" condition. Thus, when sensing element 484B opens, a signal is sent to ECU 700, where the OBD acts upon the signal and initiates a DTC that serves to indicate that a fatigue event has occurred with the fuse 484. This in turn provides a warning light on an instrument display within the passenger compartment of HEV 100 to alert the driver that HEV 100 requires services. If the driver procrastinates in getting HEV 100 in for service, appropriately configured software (which in one form may be resident within the ECU 700) can instruct a power reduction in battery pack 400 as a way to help preserve fuse 484. This would prolong the amount of time to impending fuse 484 opening. The driver would feel the power reduction as an additional reminder that HEV 100 needs to be taken in for service. The amount of time that constitutes so-called driver procrastination can be defined by the algorithm in ECU 700; for example, continued operation of the vehicle for more than 1 hour, 1 day, 1 week or 1 month after the DTC was provided to the driver could be made to trigger a suitable power reduction signal to the battery pack 400 to ensure that the HEV 100 is operated under relatively docile power settings until such time as HEV 100 is taken in to a qualified service center for diagnostics and possible repair.

Equally important is that the sensing element 484B has different fuse-opening characteristics than that of the main element 484A; these are preferably achieved by providing one or both of dissimilar materials or geometric profile. Within the present context, the term "dissimilar geometric profile" includes those configurations where the sensing element 484B is of a different shape than that of the main element 484A, as well as those configurations where the sensing element 484B is of a similar shape but of different dimensions (such as height, width or thickness dimensions) than that of the main element 484A. For example, in one form as shown in FIG. 4B, the sensing element 484B is a scaled down version of the main fuse element 484A; such scaling would represent a dissimilar geometric profile within the present context. Significantly, the ratios of aperture radius, aperture spacing and element length dimensions (shown presently as $R_1$, $R_2$, $W_1$, $W_2$, $L_1$ and $L_2$) between the main element 484A and the sensing element 484B can be tailored; these minute geometric profile changes permit fine-tuning of the sensing element 484B to open before main element 484A does. In an exemplary fashion, the sensing element 484B is made to have a higher peak strain under the same thermal cycling conditions, which in turn promotes earlier fatigue and consequent opening of the sensing element 484B prior to opening of the main fuse element 484A. As such, increasing dimensions R and L have a concomitant increase in peak fatigue strain while increasing dimension W decreases peak fatigue strain, resulting in the decrease and increase in fatigue life, respectively. In this way, the region of increased strain is defined by a geometric profile that distributes thermal expansion strain less evenly, which in turn leads to achieve a higher peak fatigue strain and related preferential opening within the sensing element 484B rather than the main element 484A. In another form, methods to preferentially promote opening of the sensing element 484B relative to the main fuse element 484A include but are not limited to using lower fatigue life materials, different heat treatment, different geometry, engineered crack initiation sites, modified thermal boundary conditions, and additional joule heating. In one form, a combination of high-purity copper and copper alloys may be used as the materials of choice. Moreover, utilizing the same production tools and handling process for both the main element 484A and sensing element 484B means the sensing element 484B can more closely track part-to-part variation within the manufacturing process, thereby further ensuring that the sensing element 484B will open prior to the main element 484A. Sample parameters that may preferably be controlled to ensure commonality between the sensing element 484B and the main element 484A include tooling, raw material batch and purity, grain properties of the material, heat treatment of the material, ambient temperature during production and handling during production. For example, the sharpness of tooling creates cuts in the elements that affects their fatigue life; in a preferred fuse fabrication process, the tools (not shown) that are used to punch the main element 484A and sensing element 4784B would have the same usage parameters and wear. Likewise, it is preferable to have the material that makes up both elements come from the same batch to avoid variations in material purity, grain direction or the like. Avoiding slight compositional changes by having relatively consistent ingredients promotes repeatable mechanical and electrical properties, while even relatively modest variations in grain direction affects fatigue life (as well as to a lesser degree electrical and thermal conduction). Having the material come from a common batch also helps ensure that all of the metal is being exposed to the same heat treatment (which also significantly impacts fatigue properties). Controlling the ambient temperature during fuse production is also preferred, as fuse durability is impacted by differences in initial strain and tolerances. Moreover, because the fuses 484 disclosed herein have small and delicate features, it is important to have both the main element 484A and the sensing element 484B be exposed to common material handling during the fuse 484 assembly process.

Equally significant is that this ability to detect imminent opening events in fuse 484 helps reduce the incidence of false DTC alerts, while still providing overall system protection for which fuse 484 is designed. This in turn helps minimize unnecessary fuse 484 replacement and cost under warranty by only notifying customers of the need for fuse 484 replacement based on an actual fuse 484 state of health. This reliance upon fatigue-related parameters allows prediction of fuse 484 opening due to accumulated fatigue damage. Moreover, by tailoring the response characteristics of sensing element 484B relative to main element 484A according to the present invention, the warning indicia provided allows an operator of HEV 100 to either adjust his or her driving habits or have a system-imposed limitation initiated until such time as the HEV 100 may be taken in for service or subjected to diagnostic analysis while there is still usable fuse 484 life.

Figure 5A:
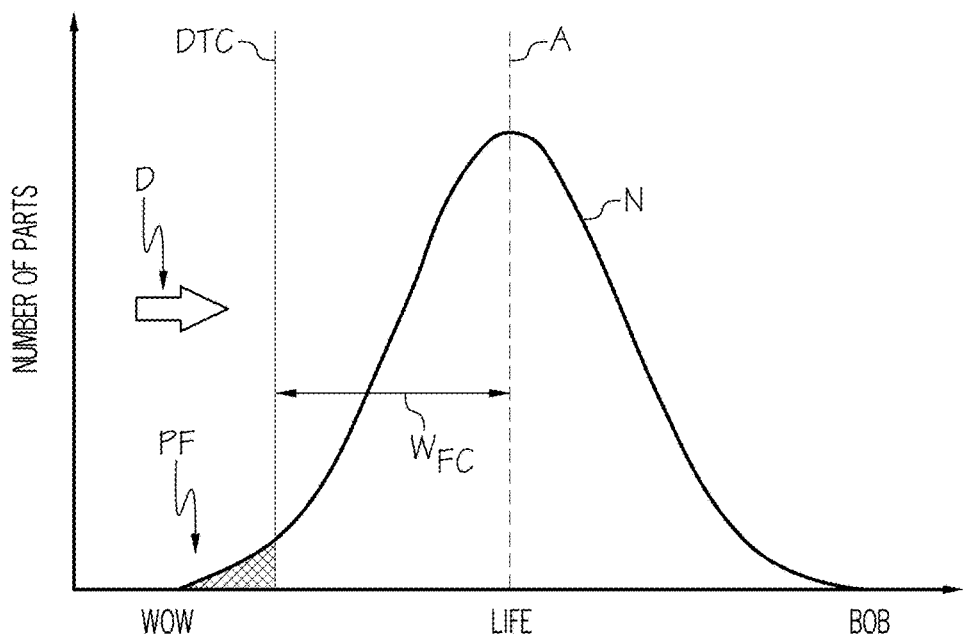
FIGS. 5A and 5B show the generation of a DTC signal according to the prior art and an aspect of the present invention, respectively.
Figure 5B:
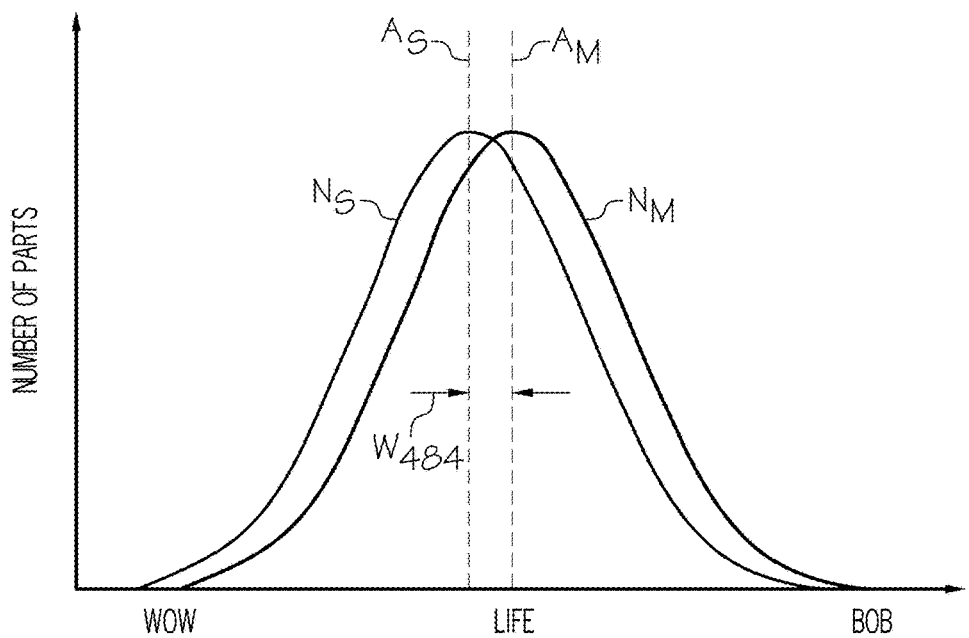

Referring next to FIGS. 5A and 5B in conjunction with FIGS. 4A and 4B, improvements in operability of HEV 100 over the prior art (FIG. 5A) made possible by the fuse 484 according to the present invention (FIG. 5B) is shown. Referring with particularity to FIG. 5A, a typical life distribution N (for example, Gaussian, Weibull or the like) for a conventional fuse $F_C$ with element E is shown, where the area underneath the curve represents the fuse life distribution for the total population of the fuse $F_C$ of FIG. 4A. The normal distribution means that most of the fuses $F_C$ will open at an average (i.e., midpoint) life A, while some (traversing leftward to the left tail WOW fuses) will have shorter life, and others (traversing rightward to the right tail BOB fuses). The rightward-pointing arrow D represents accumulated damage to the conventional fuse $F_C$ with element E, so that as vehicle (and concomitant fuse F) usage goes up, the arrow progresses toward a greater likelihood of a fuse opening event. Driving behavior is one factor that significantly impacts how rapidly the accumulated damage arrow D moves into a fatigue-induced part failure PF scenario where the likelihood of a fuse opening event is significant.

The vertical line DTC (shown notionally as being set to initiate near the at a more conservative left side of the typical life distribution N curve) represents a value set by the vehicle manufacturer as to when to send a signal to indicate when vehicle service may be required in order to avoid the aforementioned "walk home" events. For example, in setting the DTC, the manufacturer may have it coincide with a statistically small the number of premature part failures PF (for example two or three standard deviations) as shown. For conventional fuses $F_C$, the vehicle manufacturer must exercise extreme care in selecting a suitable DTC set point, for situating it too far to the left runs the risk of generating far too many false warnings to the ECU 700 (which can become an undesirable source of irritation to the operator of the vehicle who may be forced to take the vehicle in for service even absent an actual component malfunction), while setting too far to the right runs the risk of having too many (even more undesirable) driver "walk-home" events; this latter concern is particularly problematic in that as time goes by, the likelihood of fuse $F_C$ actually opening without warning (and a correspondingly larger percentage of part failures PF of the overall fuse population—which follows the accumulated damage arrow D) becomes almost inevitable. Graphically, this can be thought of as not wanting the accumulated damage arrow D to intersect DTC too early, as this would result in a battery pack/vehicular shutdown, even for situations where the vehicle is equipped with one of the statistically-worst fuses WOW. Likewise, having the DTC too far to the right means that the accumulated damage arrow D does not intersect the DTC until a significant number of the fuses $F_C$ have experienced an actual part failure PF (and therefore, vehicle-stopping) event.

Compounding the manufacturer's choice of when to have the DTC initiated is that different driving habits may have a significant impact on the how rapidly the accumulated damage D encounters a conventional fuse $F_C$ along the typical life distribution N when an actual fuse opening event occurs. For example, more aggressive driving habits tend to hasten the likelihood of a fatigue-based opening of fuse $F_C$, while more conservative driving tends to delay (or avoid altogether) a fatigue-based opening of fuse $F_C$. Without knowing the driving habits of the vehicle operator in advance results in a significant amount of fuse waste $W_{FC}$, as evidenced by the relative width between the DTC setting and the fuses $F_C$ with average-life A. As can be seen by the horizontal direction difference between the average life A of fuse $F_C$ and where a DTC is initiated as a guard against a "walk home" event, a fairly sizable number of fuses $F_C$ don't take full advantage of their useful life.

Referring with particularity to FIG. 5B, by providing the dual-element fuse 484 of the present invention, the need to pre-select the DTC of FIG. 5A is done away with. As such, rather than having an arbitrarily-selected vertical line that represents a single DTC for all fuses and all driving conditions, the present invention inherently creates a customizable sensing element curve $N_S$ that by having the sensing element 484B open first mimics that of the normal distribution curve $N_M$ for the main element 484A. Evidence of the opening of the sensing element 484B prior to that of the main element 484A can be seen by the leftward shift of the (substantially identical) sensing element normal distribution curve $N_S$ relative to that of the main element normal distribution curve $N_M$. In other words, the sensing element normal distribution curve $N_S$ curve becomes a nonlinear equivalent to the DTC of FIG. 5A except that now it need not be set in advance, but can instead vary in order to respond to actual accumulated fuse damage as represented by FIG. 5A's arrow D. In particular, advance warning of an imminent main element 484A opening is made possible by having the sensing element 484B open; this in turn generates a signal to the ECU 700 so that a DTC can alert the driver that the HEV 100 needs to be taken in for service before having an actual opening of the main element 484A is made possible, irrespective of where on the statistical distribution a particular fuse 484 lies. This achieves two important objectives. First, a smaller amount of waste $W_{484}$ may be realized, as an operating margin (as evidenced by the leftward shift of the sensing element normal distribution curve $N_S$ of the sacrificial sensing element 484B relative to the normal distribution curve $N_M$ of the main element 484A) is created. This in turn reduces the number of fuses that don't take full advantage of their useful life, thereby improving fuse 484 inventory management and related parts and service costs. Second, it significantly reduces the likelihood of a field failure and related "walk-home" event irrespective of whether the operator of HEV 100 engages in conservative or aggressive driving habits, and irrespective of whether a particular HEV 100 is equipped with a WOW fuse, a BOB fuse, or one in between, as a DTC signal is sent upon opening of the sensing element 484B well in advance of that of its corresponding main element 484A. As such, the fuse 484 of the present invention (and its nonlinear DTC-initiating signal) acts as an enabler to forewarn an operator of HEV 100 that a fuse open event is about to occur. By providing a sacrificial pre-fusing component as part of fuse 484, greater assurance against inadvertent or premature fuse opening ensues, regardless of where any given fuse 484 falls within the WOW to BOB spectrum.

As mentioned previously, having the sensing element 484B and the main element 484A be manufactured during the same production run helps to ensure closer matching of their opening response to fatigue conditions than if manufactured at separate times, using separate tools with separate batches of materials or other factors that could cause each element to occupy different parts of the normal distribution curves $N_S$ and $N_M$ as shown in the figures. This will further promote the ability of the fuse 484 of the present invention to achieve the objectives mentioned above. Thus, by having both elements be fabricated from one or both of the same tooling operating at substantially the same time (to remove errors associated with tooling wear) or same batch of raw material (to avoid lot-to-lot variations in key fatigue or electrical properties), the chances of avoiding the vagaries of manufacturing differences is further reduced.

It is noted that terms like "preferably", "commonly" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention it is noted that the term "substantially" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

For the purposes of describing and defining the present invention it is noted that the terms "battery", "battery pack" or the like are utilized herein to represent a combination of individual battery cells used to provide electric current, preferably for vehicular, propulsive or related purposes. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A sensing circuit signally cooperative with at least one battery cell within a battery pack, the circuit comprising:
    at least one fuse comprising a main element and a sensing element the latter of which defines a pre-open detection capability through at least one of (a) a material that is dissimilar from a material that defines the main element and (b) a dissimilar geometric profile from that of the main element such that a fusing event takes place in the sensing element prior to the main element;
    an electrical conductor connected to the fuse such that upon receipt of an electrical signal from the at least one battery cell or an electronic module cooperative therewith, the sensing circuit provides indicia of the fusing event through opening of the sensing element prior in time to opening of the main element.

2. The circuit of claim 1, wherein the dissimilar geometric profile defines a region of increased strain within the sensing element relative to that of the main element.

3. The circuit of claim 2, wherein the region of increased strain is defined by a geometric profile that distributes thermal expansion strain less evenly than distribution of thermal expansion strain in the main element.

4. The circuit of claim 1, wherein the sensing element comprises a dissimilar geometric profile from the main element and the material of the sensing element is the material of the main element.

5. The circuit of claim 1, wherein the material of at least one of the main element and the sensing element is selected from the group consisting of copper and its alloys.

6. The circuit of claim 5, wherein at least one of the alloys further comprises at least one of zinc, tin, lead and silver.

7. The circuit of claim 1, wherein the sensing element is secured to the main element through a joining material.

8. The circuit of claim 7, wherein the joining material is selected from the group consisting of epoxy-based adhesives, polyurethane-based adhesives, and similar bonding materials possessing electrical insulating properties, thermally-conducting properties, and thermal-mechanical properties similar to those of main element and sensing element properties.

9. A battery pack configured to provide propulsive power to a vehicle, the battery pack comprising:
    a plurality of battery cells aligned along a stacking axis to define a facing relationship thereby;
    a housing configured to contain the plurality of cells therein;
    at least one electronic control unit cooperative with at least one of the battery cells; and
    a plurality of sensing circuits signally cooperative with at least one of the battery cells, the circuit comprising:
        at least one fuse comprising a main element and a sensing element the latter of which defines a pre-open detection capability through at least one of (a) a material that is dissimilar from a material that defines the main element and (b) a dissimilar geometric profile from that of the main element such that a fusing event takes place in the sensing element prior to the main element;
        an electrical conductor connected to the fuse such that upon receipt of an electrical signal from the at least one battery cell or the electronic control unit, the sensing circuit provides indicia of the fusing event through opening of the sensing element prior in time to opening of the main element.

10. The pack of claim 9, wherein the dissimilar geometric profile defines a region of increased strain amplitude relative to that of the main element.

11. The pack of claim 9, wherein the material of at least one of the main element and the sensing element is selected from the group consisting of copper and it alloys.

12. The pack of claim 9, wherein at least one of the alloys further comprises at least one of zinc, tin, lead and silver.

13. A method of making a fuse, the method comprising:
    providing a main element of the fuse;
    providing a sensing element of the fuse; and
    connecting the sensing element to the main element, the sensing element cooperative with the main element such that a fusing event takes place in the sensing element prior to the main element through at least one of (a) a material that is dissimilar from a material that defines the main element and (b) a dissimilar geometric profile from that of the main element.

14. The method of claim 13, wherein the material of at least one of the main element and the sensing element is selected from the group consisting of copper and its alloys.

15. The method of claim 14, wherein the alloy comprises at least one of zinc, tin, lead and silver.

16. The method of claim 13, wherein the main element and the sensing element are joined to one another through a joining material.

17. The method of claim 13, wherein the main element and the sensing element are joined to one another through a welded joint or a fastener.

18. The method of claim 13, wherein the providing the main element and the sensing element comprises fabricating both from at least one of common tooling or common material.

19. The method of claim 18, wherein the common tooling operates under at least one of the tooling wear conditions and the operating parameters such that part-to-part variation in properties in both the main element and the sensing element imparted by tooling wear and operating parameters is reduced from part-to-part variation in properties of the main element and the sensing element imparted by separate tooling.

20. The method of claim 18, wherein the common material for both the main element and the sensing element is provided from a common raw material batch.

21. A method of providing battery power to a vehicle, the method comprising:

using a battery pack to provide at least a portion of propulsive power for the vehicle, wherein the battery pack is cooperative with an electronic control unit to provide indicia of a fuse opening event to personnel within the vehicle; and including a sensing circuit signally cooperative with at least one battery cell within the battery pack, the circuit comprising:

at least one fuse comprising a main element and a sensing element the latter of which defines a pre-open detection capability through at least one of (a) a material that is dissimilar from a material that defines the main element and (b) a dissimilar geometric profile from that of the main element such that a fusing event takes place in the sensing element prior to the main element; and an electrical conductor connected to the fuse such that upon receipt of an electrical signal from the at least one battery cell or an electronic module cooperative therewith, the sensing circuit provides indicia of the fusing event through opening of the sensing element prior in time to opening of the main element.

22. The method of claim 21, wherein the electronic control unit is configured such that upon continued operation of the vehicle after the indicia was provided to an operator thereof, the electronic control unit operates to impart a power reduction to the battery pack until such time as the vehicle is taken in for service to the sensing circuit.

* * * * *